United States Patent [19]

Lucker et al.

[11] 3,755,240

[45] Aug. 28, 1973

[54] THERMOSETTING PULVERULENT BINDEAR

[75] Inventors: Wilhelm Lucker, Homberg/Niederrhein; Helmut Vietz, Kamp-Lintfort, both of Germany

[73] Assignee: Deutsche Texaco Aktiengesellschaft, Hamburg, Germany

[22] Filed: Dec. 14, 1970

[21] Appl. No.: 98,112

[30] Foreign Application Priority Data

Dec. 12, 1969 Germany................... P 19 62 356.4

[52] U.S. Cl............... 260/33.6 R, 164/43, 260/38, 260/DIG. 40
[51] Int. Cl....................... C08g 51/28, C08g 53/00
[58] Field of Search...................... 260/38, DIG. 40, 260/33.6 R; 164/43

[56] References Cited
UNITED STATES PATENTS

| | | | |
|---|---|---|---|
| 2,606,888 | 8/1952 | Williams et al. | 260/38 X |
| 2,674,589 | 4/1954 | Coleman et al. | 260/38 X |
| 2,933,789 | 4/1960 | Cooper | 260/38 X |
| 3,535,252 | 10/1970 | Allen | 260/38 X |
| 3,118,850 | 1/1964 | Cooper | 260/38 |

FOREIGN PATENTS OR APPLICATIONS 853,766  11/1960  Great Britain

OTHER PUBLICATIONS

Salzherg et al., Modern Castings July, 1960 pp. 102-103 (in "Phenolic Resin Bond in Solid Sand Cores").

Primary Examiner—Morris Liebman
Assistant Examiner—S. M. Person
Attorney—Thomas H. Whaley and Carl G. Reis

[57] ABSTRACT

Thermosetting pulverulent binders suitable for use in manufacturing foundry molds comprising (a) phenol-formaldehyde novolak finely ground with hexamethylene-tetramine, (b) magnesium oxide and (c) mineral oil are prepared by spraying a pulverulent mixture of (a) and (b) maintained in a fluidized state with mineral oil.

6 Claims, No Drawings

THERMOSETTING PULVERULENT BINDER

FIELD OF THE INVENTION

This invention relates to thermosetting pulverulent binders suitable for use in flowable molding materials employed in the manufacture of foundry molds and cores. It also relates to the manufacture of such binders.

DESCRIPTION OF THE PRIOR ART

Flowable molding materials are used for manufacturing shell process molds and cores according to the Croning method, however, they are also utilized in manufacturing compact molds and cores as are employed in the stack casting process. Flowable molding materials also find use in other fields such as the manufacture of dies, cores, the lining of dies for rolling-mill blanks and dies for centrifugal castings.

Flowable molding materials used for the above-mentioned purposes consists substantially of granular, non-combustible fillers and thermosetting binders. Commonly employed granular fillers include sand, e.g., quartz sand, and as thermosetting binders generally phenol-formaldehyde resins are used. Thermosetting binders are present in such flowable molding materials, either as a coating for the filler or as a powder mixed with the granules. The form in which the thermosetting binders are incorporated in the flowable molding material depends on the respective technique utilized in the manufacture of the foundry molds.

The pulverulent powder form of thermosetting binders mixed with the granular filler is preferred if the flowable molding material is to be added to the pattern via sieve-like key plates. During this addition process as well as during transportation of the flowable molding material the pulverulent binder and the granular filler tend to separate. This separation causes the binder to agglomerate in some zones of the molding material while in other zones insufficient binder is present. The molding material thus becomes non-homogeneous resulting in the formation of defective molds, which in turn causes the molded pieces produced therein to be defective. Zones with a poor binder content will give porous and crumbly parts in the molds. The stream of liquid metal penetrates these parts or carries particles of the mold with it, thus causing protuberances, mineralizations and inclusions in the molded pieces. Such defects not only render the molded pieces useless, but unles detected beforehand they very frequently may cause defects in the tools used for finishing the molded pieces. High binder contents in the molding material are just as undesirable. They occur as binder agglomerates in the foundry core, and the corresponding parts of the molded pieces often are affected by large blisters, surface shrink holes or gas holes.

It is known to mix quartz sand with approximately 0.6 weight percent of mineral oil having a viscosity of about 6° E (i.e., degrees Engler) at 20° C and then add a pulverulent thermosetting binder, such as a phenol-formaldehyde novolak, in order to obtain a flowable molding material, in which the quartz sand and binder do not separate readily. It has been found, however, that the mineral oil is effective in preventing separation of the components of the flowable molding material for only a short time and on prolonged storage substantial separation takes place.

SUMMARY OF THE INVENTION

It is an object of this invention to prepare a thermosetting pulverulent binder which when mixed with quartz sand or any other similar filler will result in a flowable molding material with no tendency for separation of the components. Use of the binder of this invention eliminates the necessity of any pretreatment of the sand with a separate material for reducing separation. Molding materials admixed with binders of this invention do not tend to separate, even after prolonged storage times. Furthermore, foundry molds manufactured with the binder of this invention have a particularly homogeneous surface and such molds do not release any more gas during the casting process than do those manufactured with conventional binders.

Through the use of the compositions of this invention the problems associated with the binders previously employed in the art have been overcome. The novel thermosetting binder compositions of this invention comprise a mixture of phenol-formaldehyde novolak finely ground with 5 to 14 weight percent of hexamethylenetetramine based on the weight of the novolak; 3 to 15 weight percent and, preferably, 6 to 12 weight percent based on the weight of the said mixture of magnesium oxide and 1 to 6 weight percent, preferably, 3 to 4 weight percent based on the weight of the said mixture of a mineral oil having a viscosity of 12° to 30° E (i.e., degrees Engler) and preferably 20° to 25° E at 20° C. This binder is mixed, in a manner known in the art, with quartz sand or any other similar filler. The molding material thus obtained does not separate during storage or shipping, and, at the same time, it is flowable. Because of its relatively small content of mineral oil as compared to the aforementioned prior art compositions, molds manufactured with the novel molding material of this invention, as previously pointed out, do not release any more gas during casting than do molds manufactured with known binders and the added mineral oil does not contain any constituents which dissolve or swell the novolak resins.

DETAILED DESCRIPTION OF THE INVENTION

Phenol-formaldehyde novolaks useful as starting materials in the method of this invention are well-known in the art and are prepared by reacting about 0.75 to about 0.90 mole of formaldehyde per mole of phenol in the presence of an acid catalyst. The resulting novolak, which usually has a molecular weight of from about 500 to about 900 or more is actually a thermoplastic resin which becomes heat reactive when mixed with a formaldehyde donor such as hexamethylenetetramine. In the final curing step the hexamethylenetetramine decomposes to yield the required formaldehyde and ammonia which acts as a catalyst yielding as the end-product an infusible, crosslinked phenolformaldehyde polymer.

In the first step of manufacturing the binders of this invention phenol-formaldehyde novolak, which is rigid at room temperature, is ground in a manner known in the art with about 5 to about 14 weight percent of hexamethylenetetramine. The fine powder thereby obtained is mixed with magnesium oxide and the aforementioned mineral oil. The mixing operation can be performed, for example, in a so-called quick mixer. The term "quick mixer" as referred to herein means a mixing apparatus known in the art in which the feedstock is agitated so as to keep it in a fluidized state during the mixing process. A preferred embodiment of such a quick-mixer is one consisting of a closeable receiver equipped with a propeller-like agitator which rotates around a vertical axle. The finely-ground powder and pulverulent magnesium oxide are fed to the quick-mixer and, after being brought to a fluidized state by the rotating agitator, the fluidized bed thus formed with the pulverulent mixed feedstock is sprayed with mineral oil through a nozzle. In adding mineral oil the nozzle pressure employed will depend on the viscosity of the said oil. Mineral oil having a relatively high viscosity will necessarily require a higher pressure than a low viscosity oil. By adjusting the pressure corresponding to the viscosity of the mineral oil the latter is distributed optimally on the pulverulent mixed feedstock. The required pressure can be determined by one skilled in the art after a few preliminary tests. As standards in these tests, the fine and even distribution of the mineral oil on the pulverulent mixed feedstock is used. Uneven distribution results in agglomeration of the powder particles.

The fluidization state mainly depends on the frequency or rate of revolutions of the agitator. Here, too, anyone skilled in the art may find the optimal rate by means of preliminary tests. If the rotation speed of the agitator is too high, the mixed feestock will be heated to an excessive temperature while a rotational speed that is too low will cause the fluidized mixture to collapse. The mixed feedstock, when heated too strongly, agglomerates due to the novolak becoming sticky. The optimum rate of revolution of the propeller-like agitator of the afore-mentioned quick-mixer is in the range of between 500 and 1200 rpm.

The following example which illustrates one embodiment of this invention is to be considered not limitative.

EXAMPLE

Phenol-formaldehyde novolak having a softening temperature of 90 ± 5° C (Kofler method) was added to a disk attrition mill, where it was ground with sufficient hexamethylenetetramine to obtain a ground mix consisting of 89 weight percent novolak and 11 weight percent hexamethylenetetramine. 40 kg. of this ground mix and 3.1 kg. of pulverulent magnesium oxide were added to a quick-mixer of the type described above having a vertical revolution axis and equipped with an oil feed nozzle in the shape of a hollow cone arranged in the upper part of the mixer receiver. The total quantity of the material added to the mixer was such that after fluidization the surface of the pulverulent mixture remained far enough below the strictly downwardly directed nozzle for the mineral oil that the cone-shaped spray emission from the nozzle covered the entire surface of the fluidized bed. After closing the receiver, the rotational speed of the propeller-like agitator was brought up to 750 rpm. When this rate had been reached, the pulverulent mixed feedstock was in a fluidized state. Over a period of 20 seconds 1.56 kg. of mineral oil was sprayed over the surface of the fluidized bed through the aforementioned nozzle under a nitrogen pressure of 213 psig. The mineral oil employed, which consisted mainly of saturated hydrocarbons (paraffins), had a viscosity of 21° E at 20° C. After a final mixing period of 20 additional seconds, the quick-mixer was stopped and the finished binder was drawn off.

When about 2 to 3 parts by weight of this invention is mixed with about 100 parts by weight of fine quartz sand, a valuable flowable molding material suitable for use in making a wide variety of molds and cores is formed which can be stored for long periods of time prior to use with no tendency of the constituents to separate.

What is claimed is:

1. A method of manufacturing a thermosetting pulverulent binder which comprises (a) forming a fluidized bed of phenol-formaldehyde novolak finely ground with 5 to 14 weight percent of hexamethylenetetramine based on the weight of the novolak, and pulverulent magnesium oxide and (b) spraying the thus-obtained fluidized bed with a mineral oil having a viscosity of from 12° to 30° E. at 20° C., the said magnesium oxide and the said oil being employed in amounts such that the resulting binder comprises from 3 to 15 weight percent magnesium oxide, from 1 to 6 weight percent mineral oil with the balance being the novolak.

2. The method of claim 1 wherein the amount of the said magnesium oxide employed is such that the resulting binder contains 6 to 12 weight percent of magnesium oxide.

3. The method of claim 1 wherein the novolak employed contains about 11 weight percent of hexamethylenetetramine.

4. The method of claim 1 wherein the amount of said mineral oil employed is such that the resulting binder contains 3 to 4 weight percent of oil and the said oil has a viscosity of 20° to 25° E. at 20° C.

5. The method of claim 1 wherein the said novolak employed contains 11 weight percent of hexamethylenetetramine, the amount of the said magnesium oxide employed is such that the resulting binder contains 6 to 12 weight percent magnesium oxide, the amount of said mineral oil employed is such that the resulting binder contains 3 to 4 weight percent of mineral oil and the said oil has a viscosity of 20° to 25° E. at 20° C.

6. The thermosetting pulverulent binder as prepared by the method of claim 1.

* * * * *